United States Patent [19]

Bailey

[11] Patent Number: 4,553,194
[45] Date of Patent: Nov. 12, 1985

[54] PORTABLE FLOATING FISHING LIGHT

[76] Inventor: Nathan M. Bailey, 215 W. 12th St., Winston-Salem, N.C. 27101

[21] Appl. No.: 681,204

[22] Filed: Dec. 13, 1984

[51] Int. Cl.[4] .............................................. F21V 31/00
[52] U.S. Cl. .................................... 362/267; 362/253; 43/17.5; 441/13
[58] Field of Search .............. 362/186, 267, 318, 363, 362/384, 253, 458; 43/17.5; 441/13, 22; 114/123, 283

[56] References Cited

U.S. PATENT DOCUMENTS

| | | | |
|---|---|---|---|
| 1,796,460 | 3/1931 | Jackson | 362/253 |
| 2,908,101 | 10/1959 | Butler et al. | 43/17.5 |
| 3,464,139 | 9/1969 | Eggers | 362/253 |
| 3,617,733 | 11/1971 | Adams | 362/267 |
| 3,707,736 | 1/1973 | Bass | 441/13 |
| 3,720,824 | 3/1973 | Callahan | 362/267 |
| 4,503,563 | 3/1985 | Johnson | 362/267 |

*Primary Examiner*—Craig R. Feinberg
*Assistant Examiner*—David A. Okonsky
*Attorney, Agent, or Firm*—Charles R. Rhodes; Judith E. Garmon

[57] ABSTRACT

A light source, which is releasably attachable to a 12-volt battery, is mounted in floating housing. A plurality of pivot arms are attached to the housing, each of which arms includes a buoyant block or float attached to the free end thereof. When the arms are extended there is formed a stable floating platform which supports the light on the surface of a body of water. When the arms are retracted there results a compact configuration for storage and transportation.

4 Claims, 3 Drawing Figures

PORTABLE FLOATING FISHING LIGHT

BACKGROUND AND SUMMARY OF THE PRESENT INVENTION

This invention relates to floating lights, and more particularly to such a light that is more stable in use and yet may be folded into a compact unit for storage and transportation.

Outdoorsmen, such as fishermen, frequently need a portable source of light for carrying on nighttime activities, such as fishing which light source can be attached to an automobile or boat 12-volt battery. Oftentimes when fishing at night, or sometimes when fishing in murky waters, it is customary to shine a strong light into the water to attract fish.

Various floating lights have been developed for such usage, as illustrated and described in U.S. Pat. Nos. 3,617,733 to Adams; 3,745,692 to McGee; 3,707,736 to Bass; and 3,464,139 to Eggers. While all of these lights are portable in the sense that they are releasably connectable to some type of battery source, all suffer from some common drawbacks. One drawback is that the configuration of the housing in which the lamp is mounted is such that a good stable floating light is not effected. If the effective square footage of support is inadequate (which most are) the light can easily tip over when used in choppy water or bodies of water in which there are waves (such as the ocean). On the other hand, if the lamp housing or the platform on which the lamp is mounted is merely enlarged, as suggested in the Adams U.S. Pat. No. 3,617,733, there results a bulky contraption which is not easily transportable.

Therefore, a floating light which, while having an effective support area large enough to provide stable flotation, is also easily stored and transported would be desirable. Toward this end, the present invention is directed to such a device.

According to the present invention, the device in its broadest aspects includes a light source having means associated therewith for releasably connecting the light source to a voltage source, which light source is mounted in a floatable housing. In order to make the housing more stable during floation, a plurality of arms are pivotally attached to the housing, each of which arms include buoyant blocks or pads attached to the free end thereof. So arranged, when the arms are spread for use, the effective cross-sectional area of the housing is two to three times the area of the housing itself. This provides a very stable flotation housing which is not likely to tip over during usage.

On the other hand, since the arms are pivotally attached to the housing, when not in use, the arms may be folded so that the device is relatively compact and can be easily stored and transported, even in a tackle box.

It is therefore an object of the present invention to provide an improved floating fishing light.

It is another object of the present invention to provide a fishing light of the type described including a housing that can be selectively increased in effective buoyant area for use, yet folds compactly for storage and transportation.

Other objects and a fuller understanding of the invention will become apparent from reading the following detailed description along with the accompanying drawings in which.

DETAILED DESCRIPTION OF A PREFERRED EMBODIMENT

Figure 1:
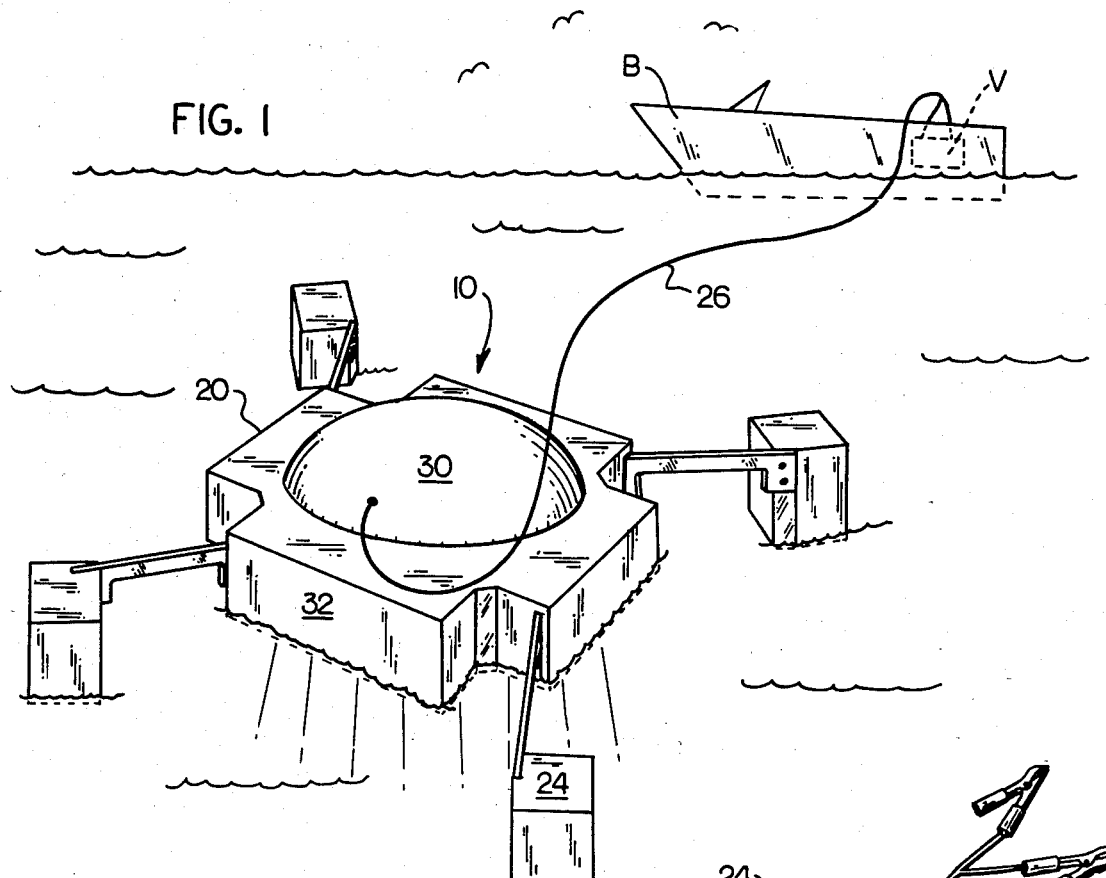
FIG. 1 is a perspective environmental view illustrating the illuminating device according to the present invention floating on a body of water.
Figure 2:
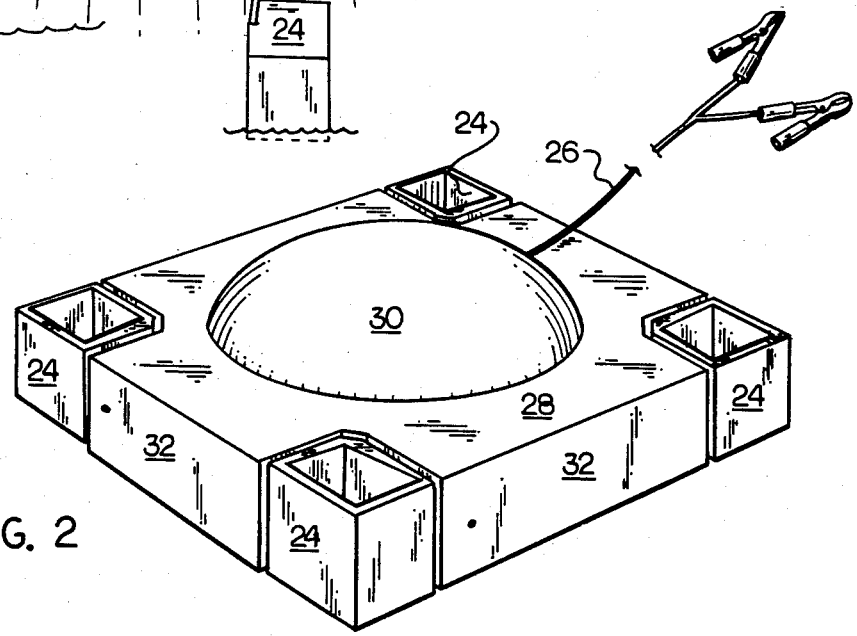
FIG. 2 is a perspective view of the invention folded together in the compact storage position.
Figure 3:
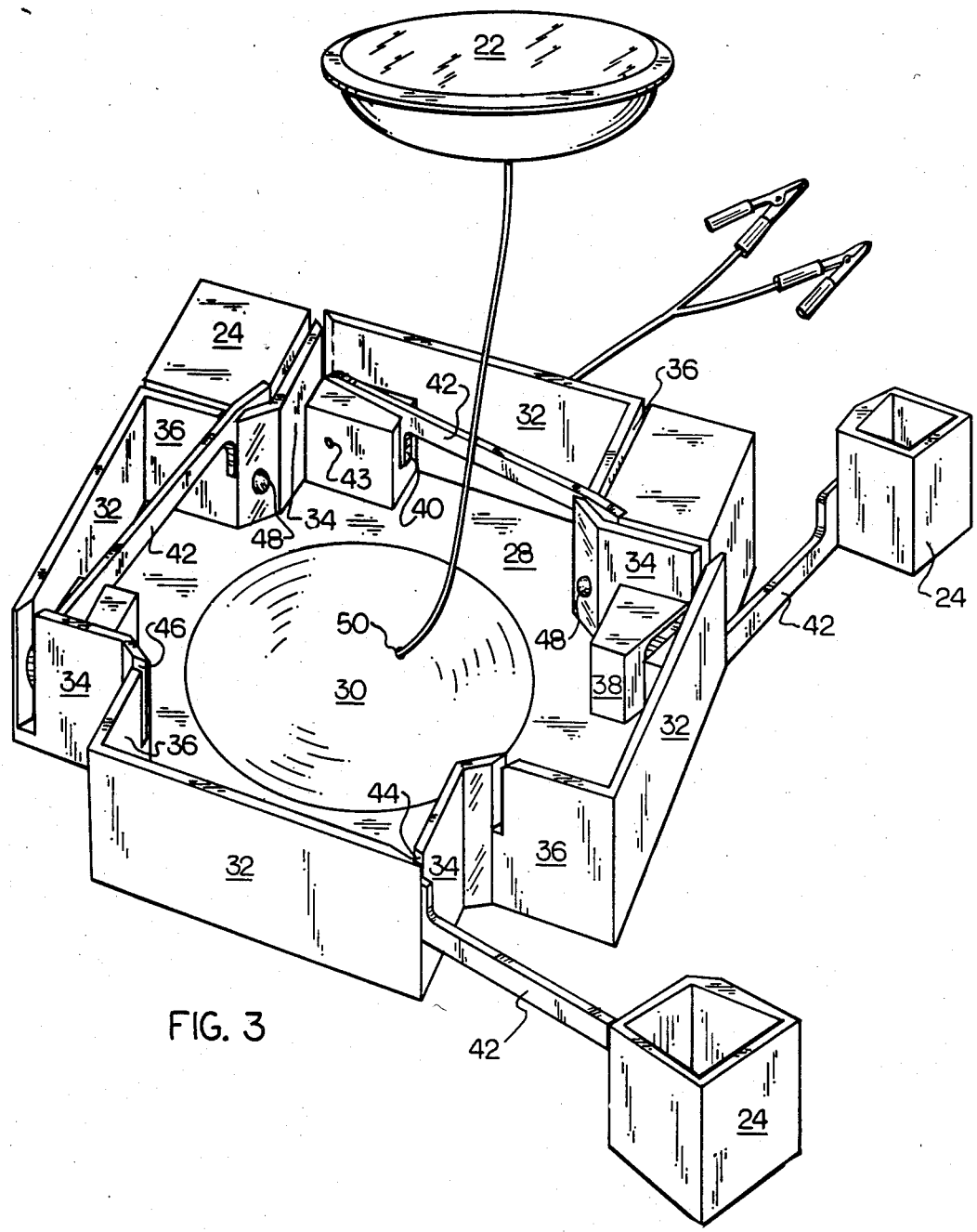
FIG. 3 is a perspective view of the underside of the light according to the present invention illustrating some of the arms in the open position and some of the arms folded in the closed position.

Turning now to the drawings, and particularly to FIG. 1, there is illustrated the fishing light 10 according to the present invention floating on a body of water and connected to an auxiliary voltage source V in turn located in a suitable location, such as a boat B. In general, the light 10 includes a housing 20 in which the lamp 22 is mounted and a plurality of buoyant blocks 24 pivotally or foldably attached to housing 20. So arranged, the buoyant blocks 24 can be folded into the configuration illustrated in FIG. 2 for storage and transportation, or they can be extended as illustrated in FIGS. 1 and 3 to provide an enlarged stable flotation platform for said floating light. A connecting wire 26 connects the contacts of lamp 22 with the voltage source V, which may be located in a boat B, in an automobile, or merely mounted separately or even in housing 20. Preferably the battery is a 12-volt storage battery to be compatible with many types of spotlights and automobile headlights.

A preferred embodiment of the housing will be described with reference to FIGS. 2 and 3. Housing 20 includes a main body portion 28 which is a planar member having a domed recess 30 therein. Planar member 28 is in the shape of a square or rectangle with each of the corners cut out. Depending walls 32 extend downwardly from all edges of the planar member 28 and the bottom of housing 20 is generally open (see FIG. 3).

Looking at the underneath side of housing 20 in FIG. 3, connecting walls 34, 36 connect the ends of each adjacent pair of side walls 32 to form a rectangular cutout at each corner of housing 20. Further, a mounting block 38 is secured to the underside of top wall 28 in each corner where walls 32 and 34 adjoin. Mounting block 38 includes an angularly extending slot 40 therein in which an arm 42 is pivotally mounted. Arms 42 can be mounted by pins 43 which extend through mounting blocks 38 and arms 42, or arms 42 can be molded with beads or projections thereon (not shown) which will snap into a mating recess within trackway 40. The aforementioned buoyant blocks 24 are then secured to the outer end of arms 42. As each buoyant block 24 is pivoted from its extended position shown in FIG. 3 to the folded position shown in FIG. 2, a first clearance slot 44 in wall 34 and a second clearance slot 46 in wall 36 pemit the passage of arm 42 therethrough.

At the intersection of each adjoining pair of walls 34, 36, there is provided protuberance or projection 48 which serves to releasably secure the lamp 22 thereunder when installed in the recess 30. The distance between opposed prouberances 48 is slightly less than the diameter of lamp 22; however, is sufficiently resilient to allow a snap fit of the lamp thereunder. Also, referring to FIG. 3, it should be noted that the electrical wire 26 which leads from lamp 22 to the voltage source V exits through an opening 50 in the domed portion 30. The connection of the electrical wires 26 to the contacts of lamp 22 should be sealed, epoxied, or otherwise protected from the water to prevent malfunction of the lamp.

So arranged, the flotation blocks 24, when folded to their extended position provide a stable flotation support platform; yet, when folded to their compact position provide for easy storage and tranporation. It should be noted that both the flotation blocks and housing 20 have no bottom wall. Thus, they are hollow underneath and when arms 42 are extended to the operative position, the hollow housing and blocks provide air pockets underneath which enhance the buoyant characteristics.

While a preferred embodiment has been described in detail hereinabove, it is apparent that various changes and modifications might be made without departing from the scope of the invention which is set forth in the claims below.

What is claimed is:

1. A floating illumination device comprising:
   (a) a light source including means for releasably connecting said light source to a voltage source
   (b) a housing means including means for mounting said light source therein;
   (c) a plurality of arms pivotally attached to said housing at spaced positions therearound and movable between a folded compact position and an extended operable position;
   (d) a buoyant block attached to the free end of each of said arms;
   (e) whereby said arms and buoyant blocks serve to support said light on the surface of a body of water when in said extended position, yet can be folded into said compact position for ease of storage and convenience of transportation.

2. The device according to claim 1 wherein said lamp and said means for releasably connecting said lamp to a voltage source are so connected with each other as to be resistant to damage from water.

3. The device according to claim 1 wherein said light source is a 12-volt lamp.

4. The device according to claim 1 wherein said housing includes:
   (a) domed upper plate having side walls depending therefrom and an open bottom;
   (b) said housing having the corners thereof cut away;
   (c) said buoyant blocks being of such size and shape as to fit within said cut-away corners when said fishing light is in said folded position;
   (d) said arms being pivotally attached to said housing as to extend outwardly from said side walls when in the extended position.

* * * * *